(12) United States Patent
Weaver

(10) Patent No.: US 7,284,869 B1
(45) Date of Patent: Oct. 23, 2007

(54) REAR LIGHT VIEWING ASSEMBLY AND METHOD

(76) Inventor: Michael C. Weaver, 7861 Rodriguez Cir., Sacramento, CA (US) 95829

( * ) Notice: Subject to any disclaimer, the term of this patent is extended or adjusted under 35 U.S.C. 154(b) by 292 days.

(21) Appl. No.: 11/032,601

(22) Filed: Jan. 11, 2005

(51) Int. Cl.
G02B 7/182 (2006.01)
B60R 1/06 (2006.01)

(52) U.S. Cl. .............. 359/872; 359/881; 359/900; 359/903; 248/467; 248/474; 248/479

(58) Field of Classification Search .......... 359/857, 359/871, 872, 881, 900, 903; 248/467, 474, 248/479
See application file for complete search history.

(56) References Cited

U.S. PATENT DOCUMENTS

| 2,257,510 A | * | 9/1941 | Mote | 359/863 |
| 2,271,110 A | * | 1/1942 | Webster | 359/527 |
| 2,573,443 A | * | 10/1951 | Holland | 248/480 |
| 4,039,818 A | | 8/1977 | Hickman | |
| 4,811,173 A | * | 3/1989 | Johnson | 362/540 |
| 4,905,376 A | * | 3/1990 | Neeley | 33/264 |
| 4,925,287 A | * | 5/1990 | Lord et al. | 359/872 |
| D309,833 S | | 8/1990 | Wahl | |
| 5,428,484 A | | 6/1995 | Baker | |
| 5,482,310 A | * | 1/1996 | Staggs | 280/477 |
| 5,825,564 A | * | 10/1998 | Mazarac | 359/872 |
| 5,959,792 A | | 9/1999 | Ibrahim | |
| 6,022,116 A | | 2/2000 | Osborn | |
| D425,001 S | | 5/2000 | Bullock | |
| 6,102,423 A | * | 8/2000 | Beck et al. | 280/477 |
| 6,206,530 B1 | | 3/2001 | Eberts | |
| 6,210,009 B1 | | 4/2001 | Daly | |
| 6,619,685 B2 | * | 9/2003 | Teague | 280/477 |
| 6,932,374 B1 | * | 8/2005 | Timms et al. | 280/477 |
| 6,955,437 B1 | * | 10/2005 | Roberts | 359/841 |
| 2006/0016954 A1 | * | 1/2006 | Saxwold | 248/467 |

FOREIGN PATENT DOCUMENTS

DE 29802515 * 4/1998
FR 2792589 * 10/2000

* cited by examiner

Primary Examiner—Ricky D. Shafer

(57) ABSTRACT

A rear light viewing assembly and method includes a panel that has a top side and a bottom side. A magnet is attached to the bottom side of the panel. An arm is removably attached to and extends upwardly from the top side. The arm has an upper end and a lower end. A mirror is attached to the upper end of the arm so that a mirrored surface of the mirror faces away from the upper end. The panel is attached to a trunk of the vehicle. The mirror is orientated so that an image of the rear lights is reflected from the mirror to a rear view mirror of the vehicle. The rear lights are actuated and viewed by the rear view mirror to determine if they are illuminated.

5 Claims, 3 Drawing Sheets

REAR LIGHT VIEWING ASSEMBLY AND METHOD

BACKGROUND OF THE INVENTION

1. Field of the Invention

The present invention relates to rear light viewing devices and more particularly pertains to a new rear light viewing device for allowing a person to view their rear lights to determine if the rear lights are functioning properly.

2. Description of the Prior Art

The use of devices for aiding a person in viewing an area adjacent to a rear of a vehicle is known in the prior art. U.S. Pat. No. 6,022,116 describes a device that is attachable to a tow vehicle for viewing a tow coupling while attaching the tow view to an item to be towed. A similar device is found in U.S. Pat. No. 6,210,009 which includes a telescopic arm having a mirror attached thereto to aid a person in viewing a remote location. Another device for viewing remote locations is shown in U.S. Pat. Des. No. 425,001. U.S. Pat. Des. No. 309,833 shows a mirror mounted on a pole which is attached to base having suction cups thereon for selectively mounting the mirror to a surface.

While these devices fulfill their respective, particular objectives and requirements, the need remains for a device that allows a person view their rear lights while sitting in a car. This will allow a person to check if the rear lights are operational without the help of a second person.

SUMMARY OF THE INVENTION

The present invention meets the needs presented above by generally comprising a panel that has a top side and a bottom side. A magnet is attached to the bottom side of the panel. An arm is removably attached to and extends upwardly from the top side. The arm has an upper end and a lower end. A mirror is attached to the upper end of the arm so that a mirrored surface of the mirror faces away from the upper end. The panel is attached to a trunk of the vehicle. The mirror is orientated so that an image of the rear lights is reflected from the mirror to a rear view mirror of the vehicle. The rear lights are actuated and viewed by the rear view mirror to determine if they are illuminated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
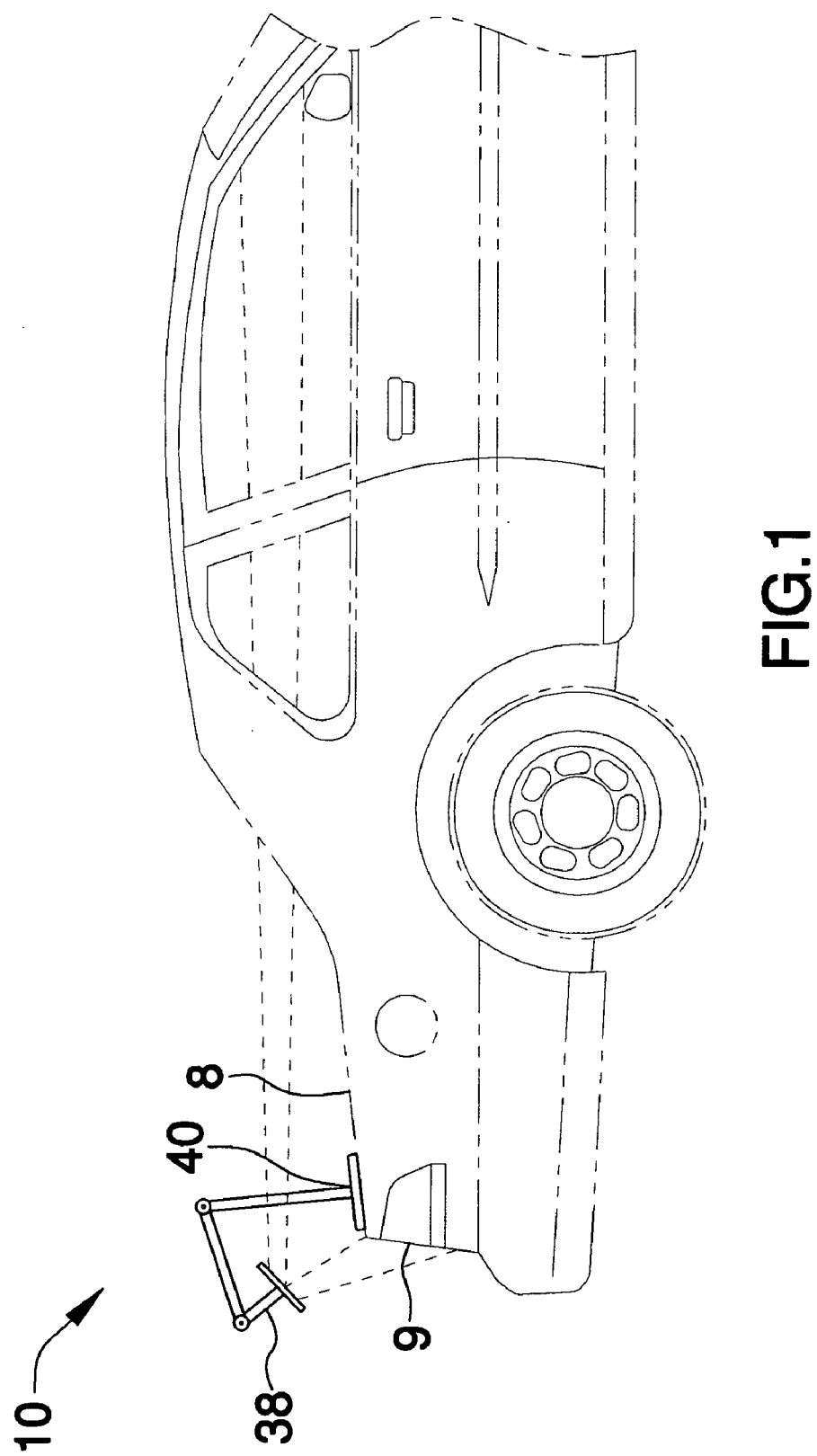
FIG. 1 is a side in-use view of a rear light viewing assembly and method according to the present invention.
Figure 2:
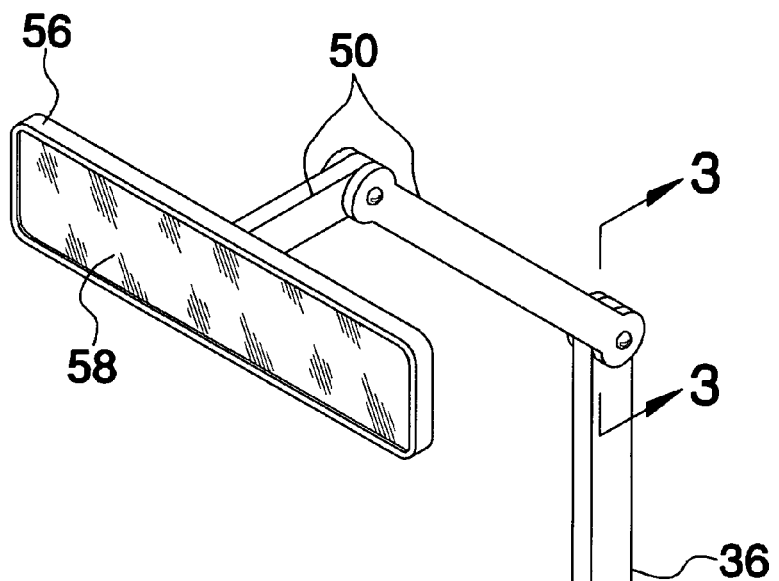
FIG. 2 is a perspective view of the present invention.
Figure 3:
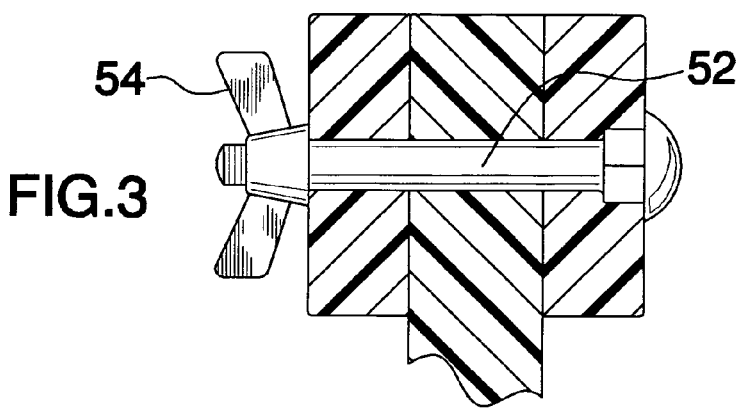
FIG. 3 is a cross-sectional view taken along line 3-3 of FIG. 2 of the present invention.
Figure 4:
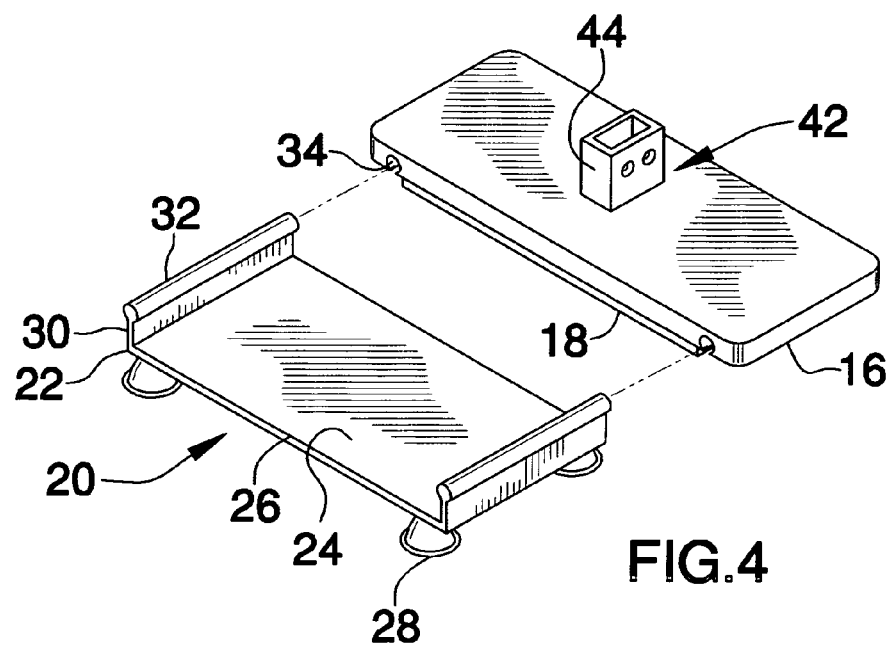
FIG. 4 is a perspective view of the present invention.

With reference now to the drawings, and in particular to FIGS. 1 through 4 thereof, a new rear light viewing device embodying the principles and concepts of the present invention and generally designated by the reference numeral 10 will be described.

As best illustrated in FIGS. 1 through 4, the rear light viewing assembly and method 10 generally includes a panel 12 that has a top side 14 and a bottom side 16. A magnet 18 is attached to the bottom side 16 of the panel 12. An auxiliary base 20 includes a plate 22 that has an upper surface 24 and a lower surface 26. The lower surface 26 has at least one suction cup 28, and preferably a plurality of suction cups 28, attached thereto. A coupler 30 is attached to the upper surface 24 for selectively attaching the auxiliary base to the bottom side of the panel. The coupler preferably 30 includes a pair of upwardly extending walls each having a rounded upper edge 32. Each of the upper edges is slidably extendable into one of a pair of elongated slots 34 in the bottom side 16 for securing the auxiliary base 20 to the panel 12. The magnet 32 is used for attaching the panel 12 to a metallic trunk surface 8 whereas the auxiliary base may be used for attaching the panel to non-metallic surfaces.

An arm 36 is removably attached to and extends upwardly from the top side 14. The arm 36 has an upper end 38 and a lower end 40. A coupler 42 is attached to the top side 14 and is adapted for removably receiving the lower end 40 of the arm 36. The coupler 42 preferably includes a sleeve 44 attached to the top side 14 for receiving the lower end 40 of the arm 36 and one or more securing members 46 being removably extendable through said sleeve 44 to hold the arm 36 in the sleeve 44. The arm 36 includes a plurality of arm sections 50 pivotally coupled together. Preferably pivot members 52 extend through the arm sections 50 for pivotally coupling the sections 50 together. Fasteners 54 on the pivot members 50 may be used for securing the sections 50 in a selected orientation with respect to each other. The plurality of arm sections 50 preferably includes three arm sections 50. A mirror 56 is attached to the upper end 38 of the arm 36. The mirror 56 is positioned so that a mirrored surface 58 of the mirror 56 faces away from the upper end.

In use, the panel 12 is attached to a trunk 8 of a vehicle with either the magnet 18 or the suction cups 28. The arm sections 50 are used to orientate the mirror 56 so that an image of the rear lights 9 is reflected from the mirror 56 to a rear view mirror of the vehicle. This allows a person to view the rear lights 9 while they are within the vehicle. The rear light 9 are actuated by turning on the lights of the vehicle and/or depressing the brake pedal of the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of testing the operational ability of rear lights of a vehicle, said method comprising the steps of;
   providing a panel having a top side and a bottom side, a magnet being attached to said bottom side of said panel;
   providing an auxiliary base including a plate having an upper surface and a lower surface, said lower surface having at least one suction cup attached thereto, a coupler being attached to said upper surface for selectively attaching said auxiliary base to said bottom side of said panel;
   providing an arm being removably attached to and extending upwardly from said top side, said arm having an upper end and a lower end;
   providing a mirror being attached to said upper end of said arm such that a mirrored surface of said mirror faces away from said upper end;
   attaching said panel to a trunk of the vehicle;
   orientating the mirror such that an image of the rear lights is reflected from the mirror to a rear view mirror of the vehicle; and
   actuating the rear lights and determining whether the rear lights are illuminated.

2. The method according to claim 1, wherein a coupler is attached to said top side and is adapted for removably receiving said lower end of said arm.

3. The method according to claim 2, wherein said arm includes a plurality of arm sections pivotally coupled together.

4. The method according to claim 1, wherein said arm includes a plurality of arm sections pivotally coupled together.

5. A method of testing the operational ability of rear lights of a vehicle, said method comprising the steps of:
   providing a panel having a top side and a bottom side, a magnet being attached to said bottom side of said panel;
   providing an auxiliary base including a plate having an upper surface and a lower surface, said lower surface having at least one suction cup attached thereto, a coupler being attached to said upper surface for selectively attaching said auxiliary base to said bottom side of said panel;
   providing an arm being removably attached to and extending upwardly from said top side, said arm having an upper end and a lower end, a coupler being attached to said top side and being adapted for removably receiving said lower end of said arm, said arm including a plurality of arm sections pivotally coupled together;
   providing a mirror being attached to said upper end of said arm such that a mirrored surface of said mirror faces away from said upper end;
   attaching said panel to a trunk of the vehicle;
   orientating the mirror such that an image of the rear lights is reflected from the mirror to a rear view mirror of the vehicle; and
   actuating the rear lights and determining whether the rear lights are illuminated.

* * * * *